(12) United States Patent
Huibers et al.

(10) Patent No.: US 7,019,880 B1
(45) Date of Patent: Mar. 28, 2006

(54) MICROMIRRORS AND HINGE STRUCTURES FOR MICROMIRROR ARRAYS IN PROJECTION DISPLAYS

(75) Inventors: Andrew Huibers, Palo Alto, CA (US); Satyadev Patel, Sunnyvale, CA (US)

(73) Assignee: Reflectivity, INC, Sunnyvale, CA (US)

( * ) Notice: Subject to any disclaimer, the term of this patent is extended or adjusted under 35 U.S.C. 154(b) by 60 days.

(21) Appl. No.: 10/927,562

(22) Filed: Aug. 25, 2004

(51) Int. Cl.
*G02B 26/00* (2006.01)

(52) U.S. Cl. ................ 359/238; 359/290; 359/291; 359/292

(58) Field of Classification Search ........... 359/238, 359/290, 291, 292, 295, 222, 223, 224, 230, 359/320
See application file for complete search history.

(56) References Cited

U.S. PATENT DOCUMENTS

| 4,566,935 | A  | 1/1986  | Hornbeck |
| 4,615,595 | A  | 10/1986 | Hornbeck |
| 5,061,049 | A  | 10/1991 | Hornbeck |
| 5,083,857 | A  | 1/1992  | Hornbeck |
| 5,784,190 | A  | 7/1998  | Worley |
| 5,835,256 | A  | 11/1998 | Huibers |
| 6,028,690 | A  | 2/2000  | Carter et al. |
| 6,046,840 | A  | 4/2000  | Huibers |
| 6,469,821 | B1 * | 10/2002 | Bartlett et al. ............. 359/292 |
| 6,512,625 | B1 * | 1/2003  | Mei et al. ................ 359/290 |
| 6,522,454 | B1 | 2/2003  | Meier et al. |
| 6,523,961 | B1 | 2/2003  | Ilkov et al. |
| 6,529,310 | B1 | 3/2003  | Huibers et al. |
| 6,804,039 | B1 | 10/2004 | Doan et al. |
| 6,819,470 | B1 * | 11/2004 | Meier et al. ............... 359/291 |
| 6,867,897 | B1 | 3/2005  | Patel et al. |
| 6,873,450 | B1 | 3/2005  | Patel et al. |
| 2002/0024641 | A1 | 2/2002 | Ilkov et al. |
| 2003/0214639 | A1 | 11/2003 | Patel |
| 2004/0004753 | A1 | 1/2004 | Pan |
| 2004/0125346 | A1 | 7/2004 | Huibers |
| 2004/0156089 | A1 | 8/2004 | Doan |
| 2004/0156090 | A1 | 8/2004 | Patel et al. |
| 2004/0233505 | A1 | 11/2004 | Huibers et al. |
| 2005/0018091 | A1 | 1/2005 | Patel et al. |

FOREIGN PATENT DOCUMENTS

| WO | WO 2004/00717  | 12/2003 |
| WO | WO 2004/000720 | 12/2003 |
| WO | WO 2004/001487 | 12/2003 |
| WO | WO 2004/109363 | 12/2004 |
| WO | WO 2004/109364 | 12/2004 |

* cited by examiner

*Primary Examiner*—Hung Xuan Dang
*Assistant Examiner*—Tuyen Tra
(74) *Attorney, Agent, or Firm*—Gregory R. Muir

(57) ABSTRACT

The micromirror of the present invention comprises a mirror plate having thereon a cavity allowing deformation of a hinge attached to the mirror plate and deflection of the mirror plate in operation.

34 Claims, 8 Drawing Sheets

MICROMIRRORS AND HINGE STRUCTURES FOR MICROMIRROR ARRAYS IN PROJECTION DISPLAYS

TECHNICAL FIELD OF THE INVENTION

The present invention is related generally to spatial light modulators, and, more particularly, to spatial light modulators with micromirror arrays and hinge structures and methods of making the same.

BACKGROUND OF THE INVENTION

Spatial light modulators (SLMs) are transducers that modulate an incident beam of light in a spatial pattern in response to an optical or electrical input. The incident light beam may be modulated in phase, intensity, polarization, or direction. This modulation may be accomplished through the use of a variety of materials exhibiting magneto-optic, electro-optic, or elastic properties. SLMs have many applications, including optical information processing, display systems, and electrostatic printing.

The present invention relates to SLMs having reflective micromirrors that are provided within a micromirror array for, e.g., projection-type displays (or for steering light beams, maskless lithography and maskless micro array production). A simplified such display system is illustrated in FIG. 1. In its very basic configuration, display system 100 comprises light source 102, optical devices (e.g. light pipe 104, condensing lens 106 and projection lens 108), display target 112 and spatial light modulator 110 that further comprises a plurality of micromirror devices (e.g. an array of micromirror devices). Light source 102 (e.g. an arc lamp) emits light through the light integrator/pipe 104 and condensing lens 106 and onto spatial light modulator 110. The micromirrors of the spatial light modulator 110 are selectively actuated by a controller (e.g. as disclosed in U.S. Pat. No. 6,388,661 issued May 14, 2002 incorporated herein by reference) so as to reflect—when in their "ON" position—the incident light into projection optics 108, resulting in an image on display target 112 (screen, a viewer's eyes, a photosensitive material, etc.). Generally, more complex optical systems, such as systems employing more than three spatial light modulators (each being designated for modulating one of the three primary colors—red, green, and red) are often used, especially in displaying applications for color images.

Currently, varieties of MEMS-based SLMs for use in display systems have been developed. Regardless of the differences, a common basic configuration of the MEMS-based SLMs comprises a hinge and a micromirror plate that is attached to the hinge for rotating relative to the substrate by the hinge. And the mechanism of the MEMS-based SLMs for display is based on rotating the micromirror plate of individual micromirrors along the hinge at different angles, thus reflecting incident light onto or away from a display target at the different angles. In this regard, mechanical properties of the hinge, the micromirror plate and the attachment of the two are critical factors to the overall performance of the micromirrors and the quality of the displayed images.

Therefore, what is needed is a spatial light modulator having micromirrors devices with robust mechanical properties for use in display systems.

SUMMARY OF THE INVENTION

Disclosed herein is a micromirror device having a deflectable and reflective mirror plate and a deformable hinge, wherein the mirror plate has a cavity in a surface other than the reflective surface provided for reflecting incident light. The deformable hinge, such as a torsion hinge can be disposed within the cavity of the mirror plate. The objects and advantages of the present invention will be obvious, and in part appear hereafter, and are accomplished by the present invention that provides a method and apparatus for operating pixels of spatial light modulators in display systems. Such objects of the invention are achieved in the features of the independent claims attached hereto. Preferred embodiments are characterized in the dependent claims. In the claims, only elements denoted by the words "means for" are intended to be interpreted as means plus function claims under 35 U.S.C. § 112, the sixth paragraph.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE EMBODIMENTS

The micromirror of the present invention comprises a reflective deflectable mirror plate attached to a deformable hinge that is held on a substrate. For holding the deformable hinge in a way such that the mirror plate and the deformable hinge are in the same plane when the mirror plate is not deflected, the mirror plate has a cavity within with the hinge is located and connected to the mirror plate. The hinge can be aligned to a surface of the mirror plate, while the surface may or may not be the reflective surface. When the hinge is align with the reflective surface, the hinge is exposed to the light beam incident to the mirror plate, and a portion of the mirror plate is shaded by the hinge from the incident light. As another example of the invention, the mirror plate is directly held by and connected to a substrate via a non-deflectable post. In this instance, the mirror plate has a deformable portion within the mirror plate.

Figure 1:
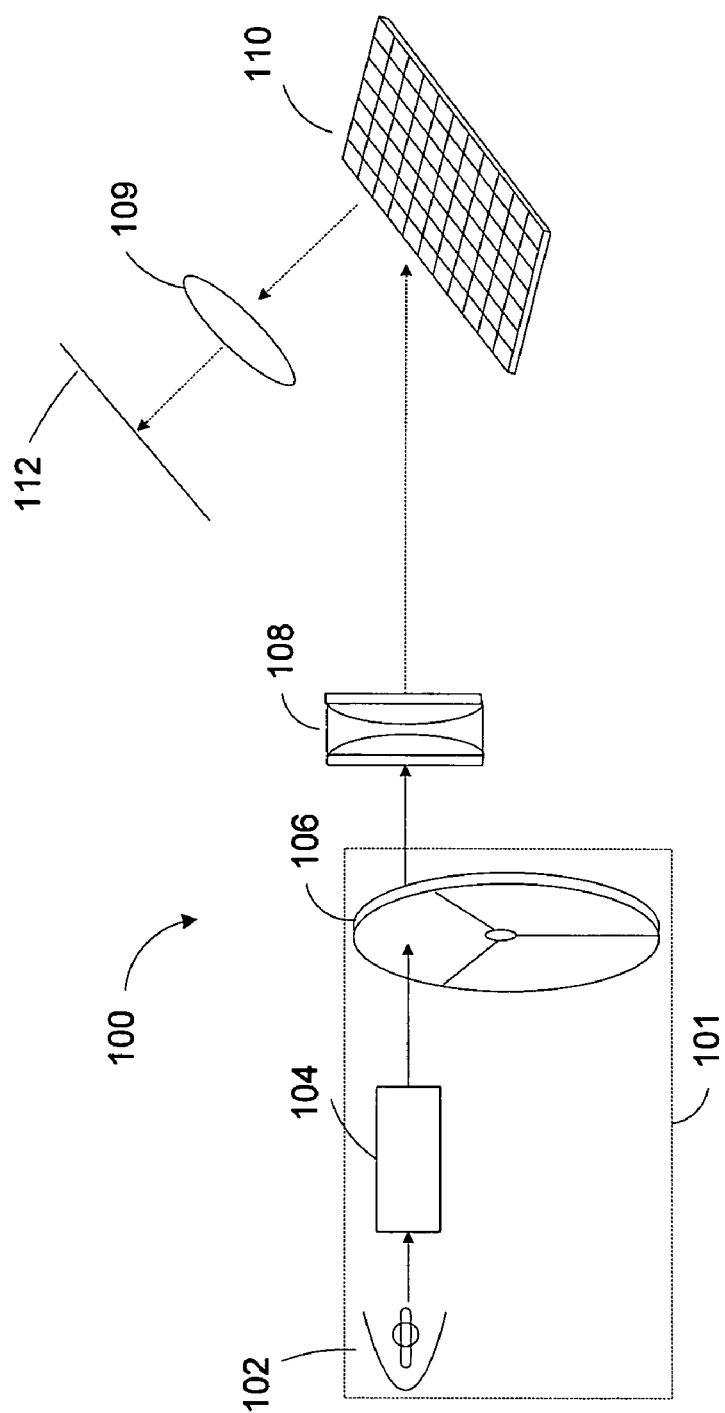
FIG. 1 diagrammatically illustrates an exemplary display system employing a spatial light modulator in which embodiments of the invention can be implemented.

The micromirror of the present invention has many applications, one of which is spatial light modulators of display systems as shown in FIG. 1. Referring to FIG. 1, an exemplary display system having a spatial light modulator composed of an array of micromirrors is illustrated therein. In its basic configuration, display system 100 comprises illumination system 101, optical elements 108 and 109, spatial light modulator 110, and display target 112.

The illumination system provides primary color light that are sequentially applied to the spatial light modulator. In an exemplary configuration, the illumination system light source 102, which can be an arc lamp, lightpipe 104 that can be any suitable integrator of light or light beam shape changer, and color filter 106, which can be a color wheel. In this particular configuration, the color wheel is positioned after the light source and lightpipe on the propagation path of the illumination light from the light source. Of course, other optical configurations can also be used, such as placing the color wheel between the light source and the lightpipe. Optical element 108, which can be a condensing lens, directs the primary color light onto the spatial light modulator in which the primary color light is reflected either into or away from projection lens 109 so as to generate a desired image pattern in the display target. The set of primary colors can comprise any set of three or more colors used to render the output image.

In a number of embodiments of the invention, the micromirror array of the spatial light modulator micromirror array has millions of micromirrors depending upon the desired resolution of the display system. For example, the spatial light modulator may have a resolution of 1024×768 or higher, or 1280×1024 or higher, or 1640×1280 or higher. Of course, the micromirror array device may have a fewer number of micromirrors than in display, or other applications, such as optical switching.

The micromirror array, especially used for display systems, can be constructed having a pitch (the center-to-center distance between adjacent micromirrors) of 25 micrometers or less, or 10.16 micrometers or less, or from 4.38 to 10.16 micrometers. The gap between adjacent micromirrors is approximately of 0.5 micrometers or less, or from 0.1 to 0.5 micrometer. And the mirror plate of the micromirror has a dimension of from 20 micrometers to 10 micrometers.

Figure 2:
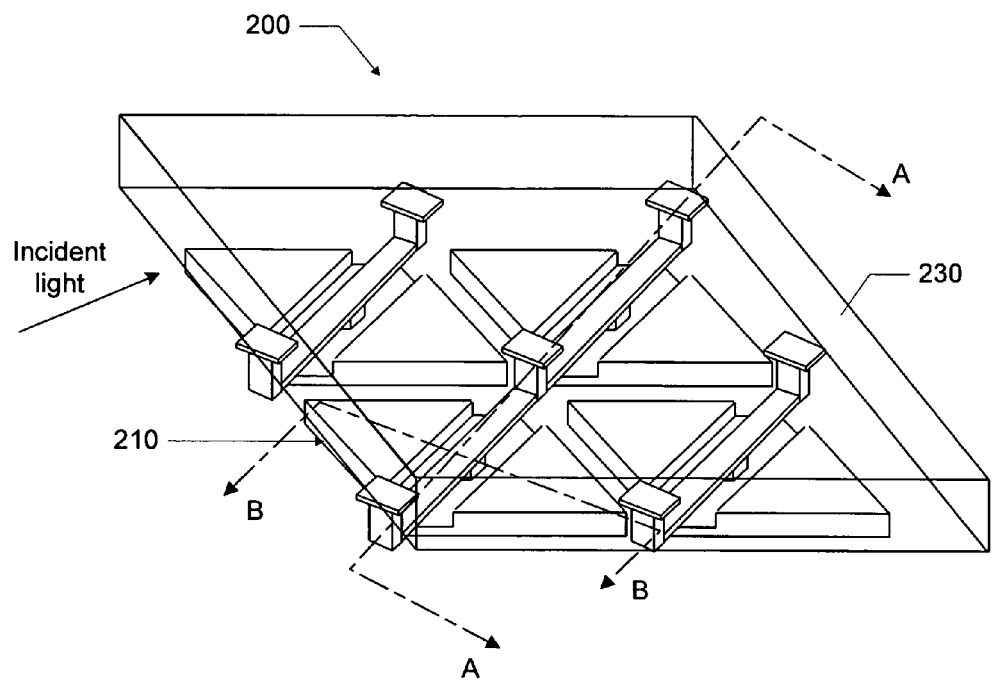
FIG. 2 is a perspective view of a portion of the spatial light modulator having a set of micromirrors according to an embodiment of the invention.

FIG. 2 illustrates a perspective view of a portion of an exemplary spatial light modulator in FIG. 1. For simplicity purposes, only 4×4 micromirrors are presented. The micromirrors are formed on substrate 230, which can be a light transmissive substrate, such as glass or quartz. Alternatively, the micromirrors can be formed on a semiconductor wafer having thereon circuitry, such as memory cells and electrodes. In another embodiment of the invention, the micromirrors can be formed on a micromirror plate that is formed on a transfer substrate that is light transmissive. Specifically, the micromirror plate can be formed on the transfer substrate and then the micromirror substrate along with the transfer substrate is attached to another substrate such as a light transmissive substrate followed by removal of the transfer substrate and patterning of the micromirror substrate to form the micromirror.

In accordance with an embodiment of the invention, the micromirror array comprises at least a micromirror whose hinge and mirror plate are in the same plane. For example, micromirror 210 comprises a mirror plate that is attached to a hinge. The mirror plate has a reflective surface for reflecting light incident thereon. In response to an electrostatic force (e.g. derived from an electrostatic field established between the mirror plate and an electrode (not shown in the figure)), the mirror plate is operable to rotates relative to the substrate. The hinge of the micromirror is positioned on the same plane as the mirror plate. In particular, the hinge is located within a trench of the mirror plate. Alternatively, the hinge and the surfaces of the mirror plate can be disposed in separate planes.

The trench can be made on the reflecting surface of the mirror plate—resulting exposure of the hinge to the incident light; and a portion of the mirror plate (e.g. the portion of the mirror plate underneath the hinge in relation to the propagation direction of the incident light) is shaded by the hinge. Alternatively, the trench can be made on the opposite surface of the mirror plate to the reflecting surface, resulting in hiding the hinge from the incident light. In accordance with yet another embodiment of the invention, the cavity can be made in the mirror plate such that the cavity faces an electrode that is disposed for deflecting the mirror plate having the cavity. This configuration is more preferred since undesired light scattering from the hinge can be avoided.

The hinge within the trench can be positioned as desired. For example, the hinge can be positioned such that a surface of the hinge is aligned with a surface of the mirror plate. In particular, for simplifying the fabrication, an example of which will be discussed in detail afterwards, the surface exposed to the incident light of the hinge is aligned to the reflecting surface of the mirror plate.

In accordance with another embodiment of the invention, though less preferred, the hinge can be positioned within the trench such that the surface of the hinge exposed to the incident light is below the reflecting surface of the mirror plate when viewed along the incident light. And the reflecting surface is preferably flat without cavity.

In accordance with yet another embodiment of the invention, the trench can be made on a surface of the mirror plate not exposed to the incident light. Specifically, the trench can be made in a surface opposite to the reflecting surface exposed to the incident light. In this way, the hinge formed within the trench will be hidden from the incident light, which is not shown in the figure. The hinge can be positioned within the trench such that a surface of the hinge is aligned with a surface of the mirror plate. And the hinge can extends across the cavity, special across the length of the trench in the particular example as shown in the figure.

For enabling the deflection of the mirror plate, the mirror plate can be attached to the hinge via a hinge contact that is positioned within the trench and between the hinge and a surface of the trench.

When the micromirror is constructed such that the hinge is positioned with the trench but exposed to the incident light (e.g. when the trench is made in the reflecting surface of the mirror plate), light scattering may occur, resulting in quality degradation of the displayed images, especially reduction in contrast ratio. This problem can be alleviated by depositing a light blocking/absorbing film on the portion of the hinge exposed to the incident light. Moreover, the trench in the mirror plate can also be coated with a light blocking/absorbing material for reducing unexpected light scattering therefrom.

Figure 3A:
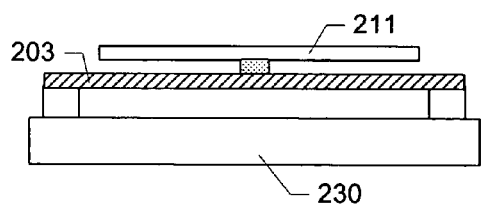
FIG. 3A is a cross-sectional view of a micromirror in FIG. 2.

For better illustrating the relative geometric positions of the mirror plate and the hinge, a cross-section view taken along line AA as shown in FIG. 2 is presented in FIG. 3A. Referring to FIG. 3A, hinge 230 is held on substrate 230 by posts. Attached to the hinge via the hinge contact is mirror plate 211. The incident light propagates from "the bottom," travels through substrate 230, and impinges hinge 203 and the reflective surface of mirror plate 211.

Figure 3B:
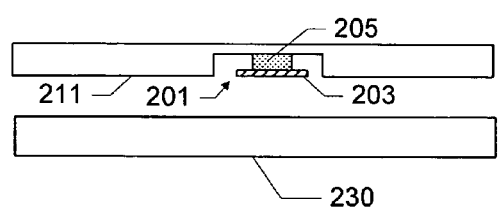
FIG. 3B is another cross-sectional view of a micromirror in FIG. 2.

FIG. 3B is another cross-section view taken along line BB in FIG. 2. It clearly shows that hinge 203 is positioned within trench 201 of mirror plate 211 and connected to the mirror plate via hinge contact 205. The trench is in the reflecting surface of the mirror plate, and thus exposed to the incident light.

Figure 4:
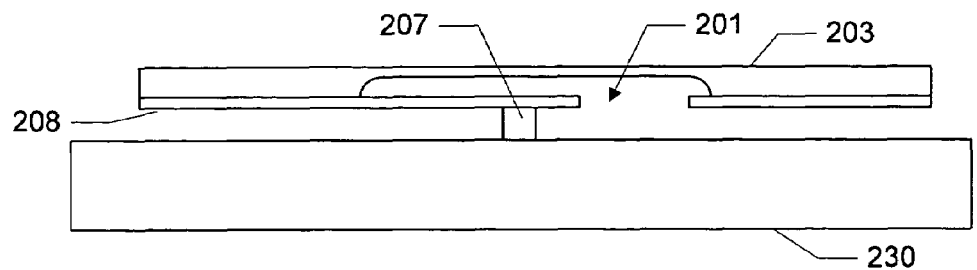
FIG. 4 is a cross-sectional view of the micromirror according to an embodiment of the invention.

Alternative to the trench in the mirror plate for the hinge to be positioned, a cavity within the mirror plate can be made for the same purposes, as shown in FIG. 4. Referring to FIG. 4, mirror plate 203 is formed on substrate 230, and held on the substrate by post 207. For enabling the rotation of the mirror plate above the substrate, elastic strip 208 is attached to the mirror plate; and cavity 201 is formed within the mirror plate. The cavity is at a location such that a portion of the elastic strip can move freely into the cavity during the deflection of the mirror plate. In this particular example, the mirror plate is held by the post, and the post is preferably positioned offset from the geometric center of the mirror plate such that the mirror plate can rotate asymmetrically—that is, the mirror plate can rotate to a larger angle in one direction than in another. Accordingly, the cavity within the mirror plate is centered at a location offset from the geometric center of the mirror plate, but centered proximately the post. Alternatively, the post can be positioned around the geometric center.

Substrate 230 in this particular example can be a light transmissive substrate, such as glass or quartz. The cavity is made in the reflective surface of the mirror plate. In operation, the incident light propagates through the substrate and impinges the elastic strip and the mirror plate. The cavity is exposed to the incident light. For reducing unexpected light scattering, the elastic strip, as well as the portion of the mirror plate underneath the hinge can be coated with a light blocking/absorbing material.

In another embodiment of the invention, the cavity can be made in a surface not exposed to the incident light, such as the surface opposite to the reflection surface of the mirror plate, which is not shown in the figure. In this instance, one or more posts can be provided to hold the elastic strip and the mirror plate on the substrate; and the elastic strip is hidden from the incident light and thus not exposed to the incident light.

Figure 5:
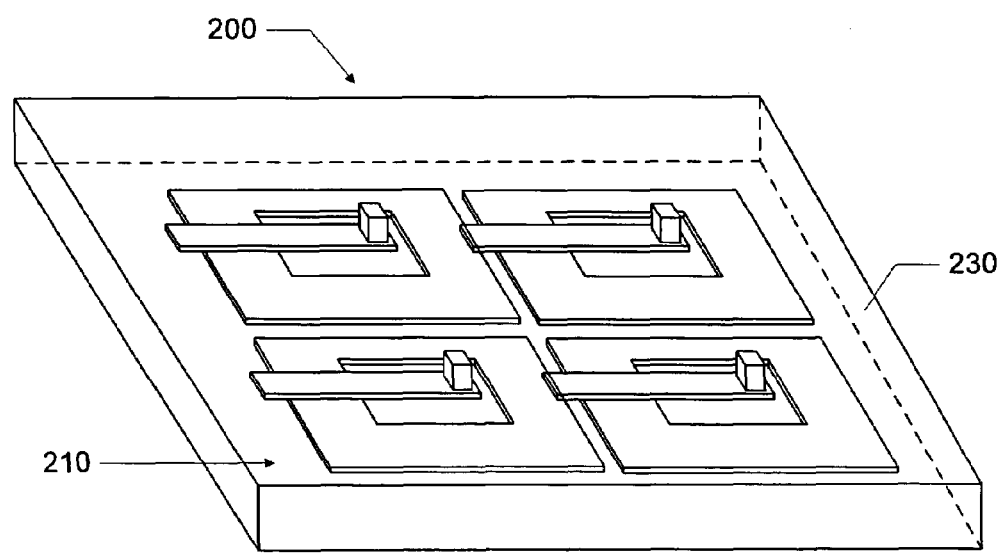
FIG. 5 is a perspective view of a portion of the spatial light modulator having a set of micromirrors in FIG. 4.

FIG. 5 illustrates a spatial light modulator having an array of micromirrors in FIG. 4. Though illustrated as rectangular or square in shape, the cavity of the individual micromirror can be in any desired shapes, such as circle or even an irregular shape, as long as the formed cavity provides a space enabling the deflection of the mirror plate.

Figure 6:
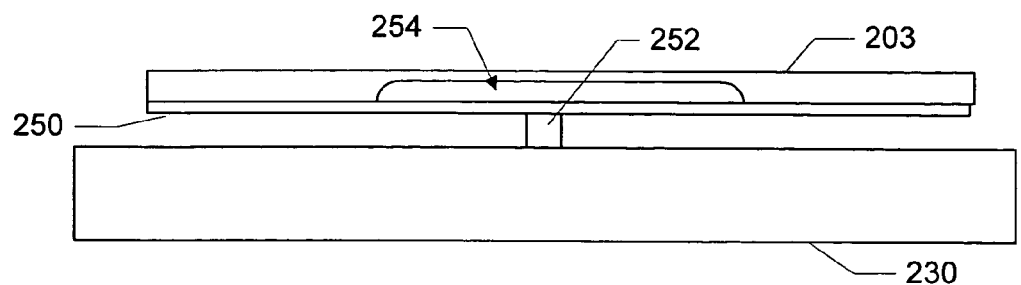
FIG. 6 is a cross-sectional view of the micromirror according another embodiment of the invention.

Referring to FIG. 6, another exemplary micromirror according to an embodiment of the invention is illustrated therein. Mirror plate 203 has cavity 254 formed on a reflective surface of the mirror plate. Elastic strip 250 is attached to the reflective surface and connected to substrate 230 via post 252. The post is positioned such that the portion of the elastic strip around the post deflects during operation, and the deflected portion can enter into the cavity such that the mirror plate can rotate.

Figure 7:
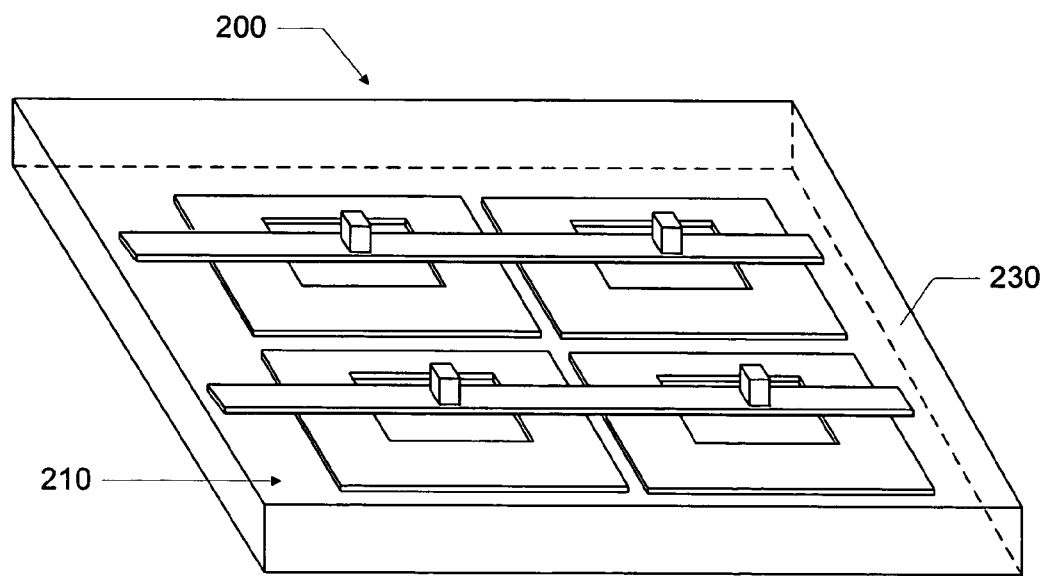
FIG. 7 illustrates a perspective view of a portion of the spatial light modulator having a set of micromirrors in FIG. 6.

FIG. 7 illustrates a perspective view of a portion of an array of micromirrors in FIG. 6. It can be seen in the drawing that, the elastic strips of individual micromirrors can be connected together to form a strip across the micromirrors of an entire row of the micromirror array. This configuration simplifies the electronic setup for the system. For example, all the mirror plates of the micromirrors can be provided with a uniform voltage via the connected frames in operation. Electrostatic forces between the mirror plates and electrodes for deflecting the mirror plates can be simply manipulated through the voltages applied to individual electrodes.

Figure 8:
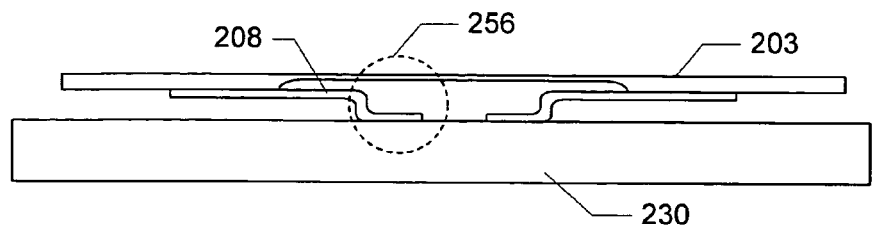
FIG. 8 is a cross-sectional view of the micromirror according to yet another embodiment of the invention.

Referring to FIG. 8, a cross-section view of another exemplary micromirror according to an embodiment of the invention is illustrated therein. The micromirror comprises mirror plate 203 and elastic strip 208 that is attached to the reflective surface of the mirror plate. The elastic strip has a flexible portion 256 that is connected to the light transmissive substrate. In order for enabling rotation of the mirror plate relative to the light transmissive substrate, the mirror plate has a cavity that is located around the flexible portion of the elastic strip. With is configuration, the cavity in the mirror plate, the elastic strip and the mirror contact in combination enables the mirror plate to rotate relative to the light transmissive substrate.

Figure 9:
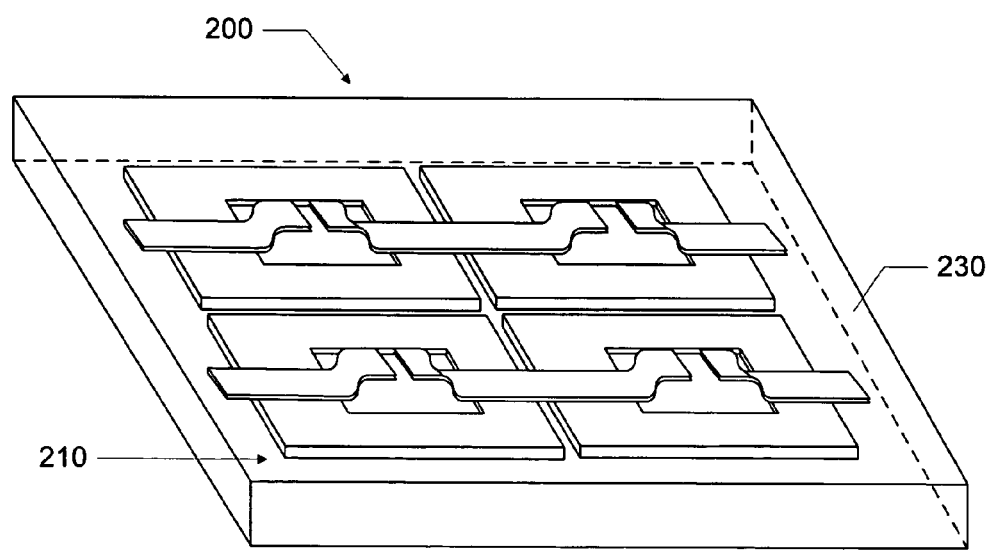
FIG. 9 illustrates a perspective view of a portion of the spatial light modulator having a set of micromirrors in FIG. 8.

FIG. 9 illustrates a perspective view of a portion of an array of micromirrors in FIG. 8. As an aspect of the embodiment of the invention, the elastic strip of the adjacent micromirrors can be connected together as shown in the figure.

Figure 10:
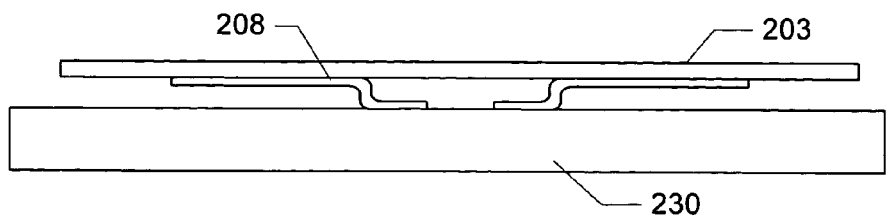
FIG. 10 is a cross-sectional view of the micromirror according to yet another embodiment of the invention.
Figure 11:
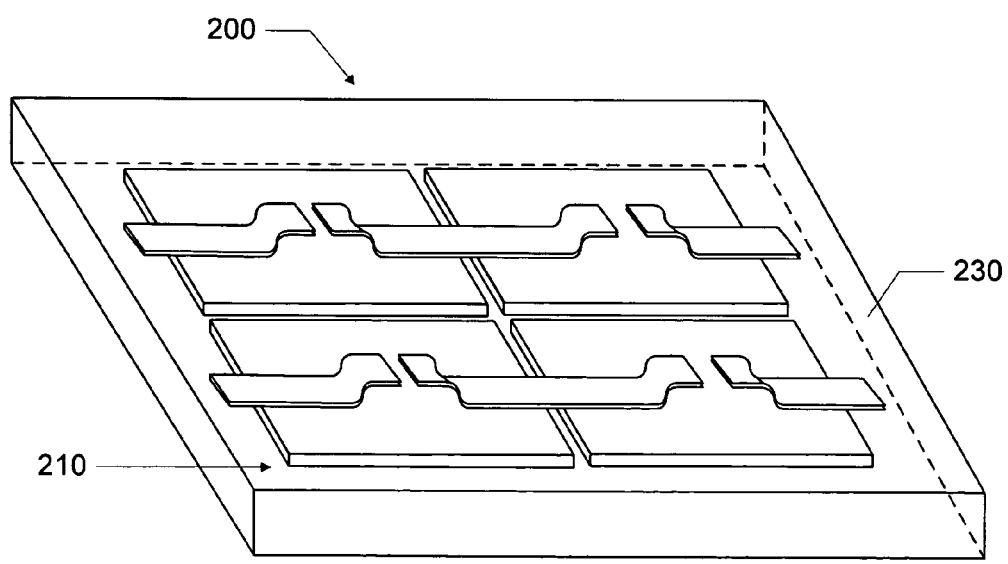
FIG. 11 illustrates a perspective view of a portion of the spatial light modulator having a set of micromirrors in FIG. 10.

In the presence of the flexible portion (e.g. flexible portion 256 in FIG. 8), the cavity may not be necessary according to another embodiment of the invention, as shown in FIG. 10. In this instance, the flexible portion extends a particular distance from the reflecting surface of the mirror plate to the light transmissive substrate—defining the particular distance between the mirror plate and the substrate. As a result, the mirror plate is able to be deflected. FIG. 11 illustrates a perspective view of a portion of an array of micromirrors of FIG. 10. As an aspect of the embodiment, the elastic strips of adjacent micromirrors can be connected together.

In the above examples, the elastic strips of the micromirrors are provided for enabling the rotation of the mirror plate. In yet another embodiment of the invention, a non-deformable post can be provided, not only for holding the mirror plate above the substrate, but also for enabling the mirror plate to rotate relative to the substrate, as shown in FIG. 12.

Figure 12:
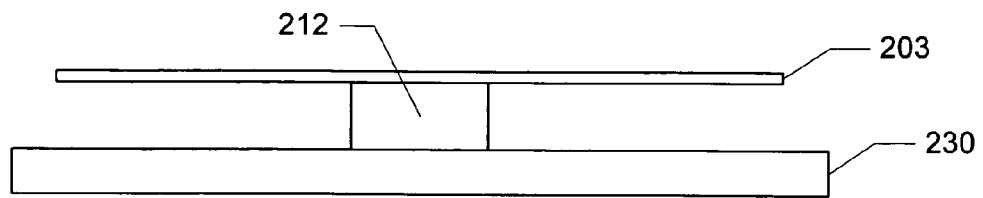
FIG. 12 is a cross-sectional view of the micromirror according to yet another embodiment of the invention.
Figure 13:
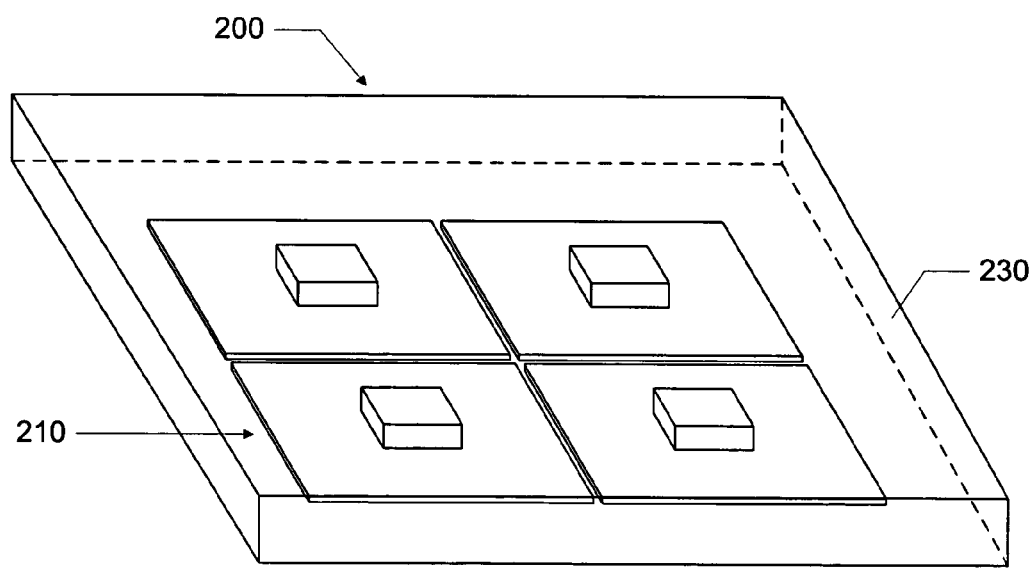
FIG. 13 illustrates a perspective view of a portion of the spatial light modulator having a set of micromirrors in FIG. 12.

Referring to FIG. 12, reflective mirror plate 203 is attached to and held by post 212 that is non-deformable and formed on the light transmissive substrate 230. In operation, an electrostatic force is exerted to the mirror plate for rotating the mirror plate relative to the substrate. The mirror plate has a reflective surface for reflecting incident light. The reflective surface, however is perfectly flat without a dent like those in the art unavoidably formed during the fabrication.

The mirror plates of the micromirrors as described above may take any desired shapes, though preferably four-sided or substantially four-sided shapes. The mirror plate may also have zigzagged edges. Because the mirror plate is responsible for reflecting the incident light, the mirror plate is desired to have a reflective surface with high reflectance, such as reflecting 90% or more, or 99% or more incident light. In accordance with the operation mechanism of the micromirror plate and the constructional design, it is desired that the posts comprise materials that are insusceptible to elastic deformation (e.g. fatigue, creep, dislocation motion) during the operation of the device. It is also preferred that such materials have large elastic modulus and exhibits high stiffness. Opposite to that of the posts, the materials of the hinge are expected to be more compliant because the hinge deforms while the micromirror plate pivots. Moreover, the hinge is desired to be electrically conducting such that the micromirror plate can be held at a particular voltage level.

In the embodiments as discussed above, the cavity can be made in any suitable shapes. In particular, the depth of the cavity is determined based on the deflection of the mirror plate. In an embodiment of the invention, the depth of the cavity is selected such that the mirror plate can be deflected. Specifically, the portion of the elastic strip in direct contact with the post (e.g. as shown in FIG. 4) can move into the cavity freely. In another embodiment of the invention, the interior surface of the cavity acts as a contacting surface for limiting the deflection of the mirror plate. Accordingly, the depth of the cavity is selected such that deflection of the mirror plate is stopped when a portion of the elastic strip contact against the interior surface of the cavity.

There is a variety of ways to construct the micromirror devices described above. An exemplary process will be discussed in the following with references to FIG. 14A and FIG for fabricating the micromirror in FIG. 3A (and FIG. 3B). It should be appreciated by those ordinary skills in the art that the exemplary processes are for demonstration purposes only and should not be interpreted as a limitation.

Figure 14A:
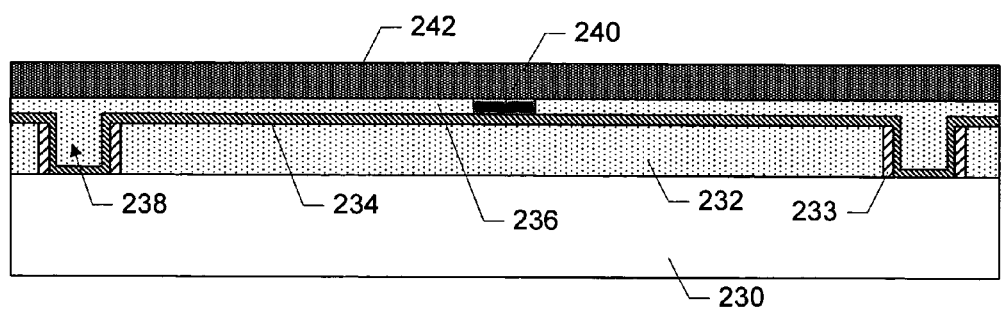
FIG. 14A and FIG. 14B are cross-section views of the micromirror in FIG. 3A and FIG. 3B during an exemplary fabrication process.
Figure 14B:
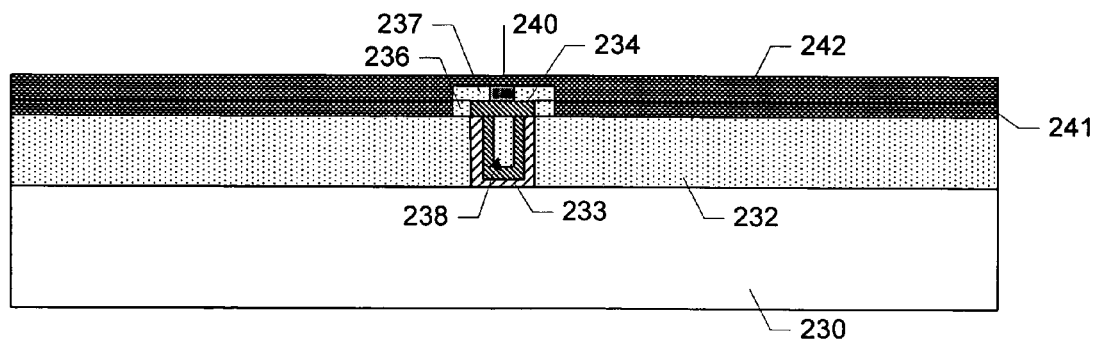

For better illustrates the exemplary fabrication process, FIG. 14A and FIG. 14B respectively illustrates the micromirror in cross-section views of FIGS. 3A and 3B in the fabrication process. Referring to FIG. 14A, substrate 230 is provided. First sacrificial layer 232 is deposited on the substrate following by patterning of the sacrificial layer so as to form post area 238 for the posts. After pattering sacrificial layer 232, post layer 233 is deposited and patterned so as to form the posts of the micromirror.

The substrate in this case is a light transmissive substrate, such as glass or quartz. First sacrificial layer 232 may be any suitable material, such as amorphous silicon, or could alternatively be a polymer or polyimide, or even polysilicon, silicon nitride, silicon dioxide, etc. depending upon the choice of sacrificial materials, and the etchant selected. If the first sacrificial layer is amorphous silicon, it can be deposited at 300–350° C. The thickness of the first sacrificial layer can be wide ranging depending upon the micromirror size and desired title angle of the micro-micromirror, though a thickness of from 500 Å to 50,000 Å, preferably around 10,000 Å, is preferred. The first sacrificial layer may be deposited on the substrate using any suitable method, such as LPCVD or PECVD.

As an optional feature of the embodiment, an anti-reflection layer (not shown in the figure) may be deposited on the surface of the substrate. The anti-reflection layer can be deposited for reducing the reflection of the incident light from the surface of the substrate. Alternatively, other optical enhancing layers may be deposited on either surface of the glass substrate as desired. As another aspect of the embodiment of the invention, a light blocking material can be deposited on the light transmissive substrate. The light blocking material can be deposited as a light blocking frame, or light blocking strips, or light blocking grid on a surface of the light transmissive substrate, or can be formed on the edges of the light transmissive substrate.

After patterning the post layers, hinge layer 234 is deposited and patterned to form the designed hinge. After completion of the hinge, a portion of the mirror plate 241 as better illustrated in FIG. 14B is formed. Mirror plate portion 241 has the sane thickness as the hinge on the first sacrificial layer. For this purpose, second sacrificial layer 236 is deposited and patterned such that, after patterning, the formed hinge is covered by the second sacrificial material. Then a portion of the mirror plate 241 is deposited and patterned. The mirror portion 241 has substantially the same thickness as hinge 234. On the formed mirror plate portion 241, third sacrificial layer 237 is deposited and patterned followed by depositing and patterning of mirror contact 240 and mirror portion 242, as better illustrated in FIG. 14B.

The materials of the structural layers, such as the hinge, the mirror plate and other members if desired of the micromirror is selected according to their designated functions, as well as the etching method to be used for removing the sacrificial materials. In particular, because the micromirror is designated for reflecting incident light in the spectrum of interest (e.g. visible light spectrum), it is preferred that the micromirror plate layer comprises of one or more materials that exhibit high reflectivity (preferably 90% or higher) to the incident light. According to one embodiment of the invention, micromirror plate layer 300 is a multi-layered structure. For example, the multilayered hinge may comprise a reflection layer, a protection layer, and an enhancing layer. The reflection layer may comprise one or more materials exhibiting high light reflectivity. Examples of such materials are Al, Ti, AlSiCu or TiAl. In the preferred embodiment of the invention, layer 305 is aluminum with a thickness of 2500 Å. This aluminum layer is preferred to be deposited at 150° C. or other temperatures preferably less than 400° C. The protection layer may be a $SiO_x$ layer with a preferred thickness of 400 Å. The enhancing layer may be comprised of metal or metal alloy for enhancing the electric and mechanical properties of the micromirror plate. An example of such enhancing layer is titanium with a thickness of 80 Å. Of course, other suitable materials having high reflectivity to the incident light of interest may also be adopted for the micromirror plate. In depositing the micromirror plate layer, PVD is preferably used at 150° C. The thickness of the micromirror plate layer can be wide ranging depending upon the desired mechanical (e.g. elastic module), the size of the micromirror, desired titled angle and electronic (e.g. conductivity) properties of the micromirror plate and the properties of the materials selected for forming the micromirror plate. According to the invention, a thickness of from 500 Å to 50,000 Å, preferably around 2500 Å, is preferred. In patterning the mirror plate, the standard photoresist patterning followed by etching using, for example CF4, C12, or other suitable etchant depending upon the specific material of the micromirror plate layer can be employed.

Because the hinge provides a rotation axis for the micromirror plate, it is natural to expect that the hinge layer comprises a material that is at least susceptible to plastic deformation (e.g. fatigue, creep, and dislocation motion). Furthermore, when the hinge layer is also used as electric contact for the micromirror plate, it is desired that the material of the hinge layer is electrically conductive. Examples of suitable materials for the hinge layer are silicon nitride, silicon oxide, silicon carbide, polysilicon, Al, Ir, titanium, titanium nitride, titanium oxide(s), titanium carbide, $CoSiN_x$, $TiSiN_x$, $TaSiN_x$, or other ternary and higher compounds. When titanium is selected for the hinge layer, it can be deposited at 100° C. Alternatively, the hinge layer may comprise of multi-layers, such as 100 Å $TiN_x$ and 400 Å $SiN_x$. It should be noted that hinge 326 can be a flexure, torsion or a combination flexure-torsion hinge, and its thickness need not be the same as that of micromirror 300. On the contrary, a reduced thickness compared to the micromirror plate increases the flexibility of the hinge, allowing the micromirror plate a greater pivoting angle relative to the substrate.

In an embodiment of the invention, the micromirror plate layer may comprise an aluminum layer, and the second sacrificial layer is silicon. This design, however, can cause defects in the hinge structure due to the diffusion of the aluminum and silicon at the edges of the micromirror plate, wherein the aluminum is exposed to the silicon. To solve this problem, a protection layer (not shown) may be deposited on the patterned micromirror plate before depositing the second sacrificial silicon layer such that the aluminum layer can be isolated from the silicon sacrificial layer. Then the protection layer is patterned according to the shape of the micromirror plate.

It will be appreciated by those of skill in the art that a new and useful spatial light modulator has been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates such embodiments as may come within the scope of the following claims and equivalents thereof.

We claim:

1. A spatial light modulator, comprising:
   an array of micromirrors, each micromirror comprising a deformable hinge and a deflectable reflective mirror plate attached to the deformable hinge, wherein the mirror plate comprises a cavity in a surface of the mirror plate; wherein a portion of the deformable hinge is disposed within the cavity at least during a rotation of the mirror plate.

2. The spatial light modulator of claim 1, wherein the micromirror further comprises:
   a substrate; and
   a post by which the mirror plate and the hinge of the micromirror is held on the substrate.

3. The spatial light modulator of claim 2, wherein the substrate is transmissive to visible light.

4. The spatial light modulator of claim 2, wherein the cavity is an elongated trench; and
   wherein the portion of the hinge is disposed within the trench then the mirror plate is not deflected.

5. The spatial light modulator of claim 2, wherein the hinge has a surface that is aligned to the same plane as the reflective surface of the minor plate.

6. The spatial light modulator of claim 5, wherein the surface of the hinge comprises a light blocking layer.

7. The spatial light modulator of claim 2, wherein the hinge is exposed to a light that is directed to the reflective surface of the minor plate for being modulated.

8. The spatial light modulator of claim 7, wherein the binge projects a shadow on the reflective surface of the mirror plate in the presence of the incident light.

9. The spatial light modulator of claim 2, wherein the hinge is outside the cavity when the mirror plate is not deflected, but inside the cavity when the mirror plate is deflected.

10. The spatial light modulator of claim 9, wherein the hinge is exposed to a light beam directed to the reflective surface of the mirror plate.

11. The spatial light modulator of claim 2, wherein the substrate is glass or quartz.

12. The spatial light modulator of claim 2, wherein the mirror plates is operable to switch between an ON state and an OFF state, wherein the mirror plate is rotated to an ON state angle in the ON state, and to an OFF state angle other than the ON state angle in the OFF state.

13. The spatial light modulator of claim 12, wherein the ON state angle is 10° or more relative to the substrate.

14. The spatial light modulator of claim 12, wherein the ON state angle is 12° or more relative to the substrate.

15. The spatial light modulator of claim 12, wherein the ON state angle is 14° or more relative to the substrate.

16. The spatial light modulator of claim 2, wherein the mirror plate is substantially square.

17. The spatial light modulator of claim 2, wherein the mirror plate has a zigzagged edge.

18. The spatial light modulator of claim 1, further comprising: an array of electrodes and circuitry with each electrode and circuitry being associated with a micromirror of the micromirror array for deflecting the mirror plate of the micromirror.

19. The spatial light modulator of claim 18, wherein the electrodes and circuitry are formed on a separate substrate than a substrate on which the micromirrors are formed.

20. The spatial light modulator of claim 18, wherein the electrodes and circuitry are formed on a substrate on which the micromirrors are formed.

21. The spatial light modulator of claim 1, wherein the cavity is located in a reflecting surface of the mirror plate.

22. The spatial light modulator of claim 1, wherein the cavity is located in a surface opposite to a reflecting surface of the mirror plate.

23. The spatial light modulator of claim 22, wherein the reflecting surface has no cavity and is substantially flat.

24. The spatial light modulator of claim 1, wherein the hinge extends the cavity.

25. The spatial light modulator of claim 1, wherein the hinge is a torsion hinge and is operable to rotate proximate to or within the cavity.

26. The spatial light modulator of claim 1, wherein the cavity is disposed such that the cavity faces an electrode provide for rotating said mirror plate.

27. A projection system, comprising;
   an illumination system providing a light beam;
   a spatial light modulator of claim 1;
   an optical element for directing the light onto or from the spatial light modulator; and
   a display target.

28. The system of claim 27, wherein the illumination system further comprises:
   a light source;
   a lightpipe; and
   a color filter.

29. The system of claim 28, wherein the color filter is positioned between the light source and lightpipe.

30. The system of claim 28, wherein the color filter is positioned after lightpipe and the light source along a propagation path of light from the light source.

31. A spatial light modulator, comprising:
an array of micromirrors, each of which comprises a deformable hinge; and deflectable mirror plate attached to the deformable hinge, wherein the mirror plate has a reflective surface that is substantially flat without a dent, and another surface having a cavity.

32. The spatial light modulator of claim 31, wherein the micromirror further comprises: a substrate; and a non-deflectable post directly connecting the mirror plate to the substrate.

33. The spatial light modulator of claim 31, wherein at least a portion of the deformable hinge is disposed in the cavity.

34. The spatial light modulator of claim 31, wherein the deformable hinge is connected to a portion of the cavity via a contact.

* * * * *